(12) United States Patent
Van De Sluis et al.

(10) Patent No.: US 10,267,505 B2
(45) Date of Patent: Apr. 23, 2019

(54) PORTABLE LIGHTING DEVICE

(71) Applicant: SIGNIFY HOLDING B.V., Eindhoven (NL)

(72) Inventors: Bartel Marinus Van De Sluis, Eindhoven (NL); Tommy Reinhoudt, Eindhoven (NL); Berent Willem Meerbeek, Eindhoven (NL); Dirk Valentinus René Engelen, Heusden-Zolder (BE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/569,990

(22) PCT Filed: Apr. 21, 2016

(86) PCT No.: PCT/EP2016/058841
§ 371 (c)(1),
(2) Date: Oct. 27, 2017

(87) PCT Pub. No.: WO2016/173914
PCT Pub. Date: Nov. 3, 2016

(65) Prior Publication Data
US 2018/0306424 A1    Oct. 25, 2018

(30) Foreign Application Priority Data
Apr. 28, 2015  (EP) .................................... 15165439

(51) Int. Cl.
*F21V 23/04*     (2006.01)
*G06F 3/03*      (2006.01)
(Continued)

(52) U.S. Cl.
CPC ...... *F21V 23/0471* (2013.01); *F21V 23/0414* (2013.01); *F21V 23/0435* (2013.01);
(Continued)

(58) Field of Classification Search
CPC ........ G06F 3/0304; G06F 3/0312; G06F 9/04; G06F 9/06
See application file for complete search history.

(56) References Cited

U.S. PATENT DOCUMENTS

2009/0261737 A1    10/2009  Wright et al.
2013/0225037 A1     8/2013  Deluz
(Continued)

FOREIGN PATENT DOCUMENTS

JP        2011232121 A       11/2011

OTHER PUBLICATIONS

Wimmer, Raphael, et al., "Handsense-Discriminating Different Ways of Grasping and Holding a Tangible User Interface," TEI 2009, Cambridge, UK (4 Pages).

*Primary Examiner* — Thuy Vinh Tran
(74) *Attorney, Agent, or Firm* — Meenakshy Chakravorty (57) ABSTRACT

A portable lighting device comprises at least one light source arranged to emit light to illuminate an environment of the portable lighting device; at least one sensor arranged to provide a sensor output signal; and a control module arranged to receive the sensor output signal from the at least one sensor. The control module is configured to: detect user manipulation of the portable lighting device; control the light emitted based on the detected user manipulation; detect translational movement of the portable lighting device; and control the light emitted from the at least one light source based on the translational movement.

14 Claims, 6 Drawing Sheets

(51) Int. Cl.
*G06F 9/06* (2006.01)
*G06F 9/04* (2006.01)
*F21W 131/105* (2006.01)
*F21W 131/109* (2006.01)
*F21Y 101/00* (2016.01)
*F21L 4/00* (2006.01)

(52) U.S. Cl.
CPC ...... *F21V 23/0464* (2013.01); *F21V 23/0478* (2013.01); *F21V 23/0485* (2013.01); *F21V 23/0492* (2013.01); *F21L 4/00* (2013.01); *F21W 2131/105* (2013.01); *F21W 2131/109* (2013.01); *F21Y 2101/00* (2013.01); *G06F 3/0304* (2013.01); *G06F 3/0312* (2013.01); *G06F 9/04* (2013.01); *G06F 9/06* (2013.01)

(56) References Cited

U.S. PATENT DOCUMENTS

| | | | |
|---|---|---|---|
| 2014/0210375 A1 | 7/2014 | Naumann | |
| 2014/0268700 A1 | 9/2014 | Mumma et al. | |
| 2015/0226406 A1* | 8/2015 | Lashina | H05B 37/0218 362/235 |
| 2016/0187023 A1* | 6/2016 | Bevan | F24F 11/0086 236/1 C |

* cited by examiner

PORTABLE LIGHTING DEVICE

CROSS-REFERENCE TO PRIOR APPLICATIONS

This application is the U.S. National Phase application under 35 U.S.C. § 371 of International Application No. PCT/EP2016/058841, filed on Apr. 21, 2016, which claims the benefit of European Patent Application No. 15165439.9, filed on Apr. 28, 2015. These applications are hereby incorporated by reference herein.

TECHNICAL FIELD

The present disclosure relates to a portable lighting device.

BACKGROUND

Recent advances in both solid-state lighting and rechargeable batteries, has enabled the generation of energy-efficient, compact portable lighting devices that people can carry with them. A portable lighting device is a lighting device that can provide its illumination function without a wired power supply, typically being battery powered by means of a battery on board the lighting device, or potentially instead being powered by another type of on-board power supply such as a manual dynamo, or even being powered using a wireless power transfer (WPT) technique based on radiative electromagnetic induction. A portable lighting device can thus be taken by the user from one location to the next. For instance, a portable lighting device may be taken from a living room to a garden terrace or to a bathroom to create a cozy or romantic ambience.

Typically the light emitted by known portable lighting devices can be controlled using one or more switches located on the portable lighting. Other portable lighting devices include touch-sensitive surfaces that may be at least partially capacitive. A user's touch may be detected based on a change in that capacitance, and light emitted by one or more light sources of the portable lighting device may be altered based on the nature of the user's touch.

SUMMARY

According to one aspect of the present disclosure there is provided a portable lighting device comprising: at least one light source arranged to emit light to illuminate an environment of the portable lighting device; at least one sensor, each of the at least one sensor arranged to provide a sensor output signal; and a control module arranged to receive the sensor output signal from each of the at least one sensor, wherein the control module is configured to: detect user manipulation of the portable lighting device relative to a support surface on which the portable lighting device is supported based on one or more of the at least one sensor output signal; and control the light emitted from the at least one light source based on the detected user manipulation; and detect translational movement of the portable lighting device relative to said support surface based on one or more of the at least one sensor output signal; and control the light emitted from the at least one light source based on the detected translational movement.

The control module may be configured to only perform said control if detection of the user manipulation occurred whilst an operating mode of the control module is active.

The control module may be configured to determine that the portable lighting device is positioned on said support surface based on one or more of the at least one sensor output signal and activate said operating mode in response to said determination.

The control module may be configured to determine that the portable lighting device is positioned in a substantially horizontal plane based on one or more of the at least one sensor output signal and activate said operating mode in response to said determination.

The portable lighting device may further comprise a communication interface, and the control module may be configured to activate said operating mode in response to receiving, via said communication interface, an instruction received from a remote control device.

The control module may be configured to detect rotation of the portable lighting device relative to said support surface based on one or more of the at least one sensor output signal, and control the light emitted from the at least one light source based on the detected rotation. The control module may be configured to control the light emitted from the at least one light source based on a detected direction of rotation.

The control module may be configured to control the light emitted from the at least one light source based on a detected direction of translational movement.

The control module may be configured to (i) determine a position of a user's fingers touching the portable lighting device during the user manipulation based on one or more of the at least one sensor output signal, (ii) based on said determination, detect whether the translational movement of the portable lighting device is towards or away from said user, and (iii) control the light emitted from the at least one light source based on said detection.

The portable lighting device may further comprise a memory storing a plurality of lighting commands, and the control module may be configured to query said memory to determine a lighting command based on the detected user manipulation, and send the lighting command to the at least one light source to control the light emitted from the at least one light source.

The portable lighting device may further comprise a communication interface, wherein the control module may be configured to transmit the lighting command, via the network interface, to at least one remote lighting device to control the light emitted by the at least one remote lighting device.

The control module may be configured to control at least one lighting parameter of the light emitted from the at least one light source based on the detected user manipulation, the at least one lighting parameter being one or any combination of: intensity, color, saturation, color temperature, size, shape, pattern, and dynamics of the light emitted from the at least one light source.

The control module may be configured to operate in one of a plurality of light parameter control modes, whereby in each light parameter control mode, the control module is configured to control a different lighting parameter of the light emitted from the at least one light source.

The portable lighting device may comprise at least one light emitting feedback element and the control module may be configured to control the at least one light emitting feedback to emit light to provide an indication of the at least one lighting parameter that is varied when a user manipulates the portable lighting device and how manipulation of the portable lighting device varies the at least one lighting parameter.

According to another aspect of the present disclosure there is provided a computer program product comprising code embodied on a computer-readable medium and being configured so as when executed on a processor of a portable lighting device comprising at least one light source arranged to emit light to illuminate an environment of the portable lighting device, and at least one sensor, each of the at least one sensor arranged to provide a sensor output signal, to: detect user manipulation of the portable lighting device relative to a support surface on which the portable lighting device is supported based on one or more of the at least one sensor output signal; and control the light emitted from the at least one light source based on the detected user manipulation.

In embodiments, the computer program product may be further configured in accordance with any of the features of the control module disclosed herein.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

In the following described embodiments a control module of a portable lighting device uses inputs received from at least one sensor of the portable lighting device to detect user actions which manipulate the portable lighting device relative to a support surface on which the portable lighting device is supported and controls the light output by the portable lighting device based on the detected user manipulation.

In order to avoid unintentional control when the portable lighting device is picked up by a user, in some embodiments the control module is able to selectively operate in an interaction operating mode. Activation of the interaction operating mode may be implemented in various ways described in more detail below. Only when the control module 110 is operating in the interaction operating mode does the control module convert sensed motion inputs to lighting commands to control light source(s) of the portable lighting device.

A user of the portable lighting device interacts with the device itself (rather than switches or touch-sensitive areas on the device) to control the light output by the portable lighting device such that an easy and intuitive mechanism for controlling the light output is provided giving a feeling of "being in control" to the user.

Figure 1:
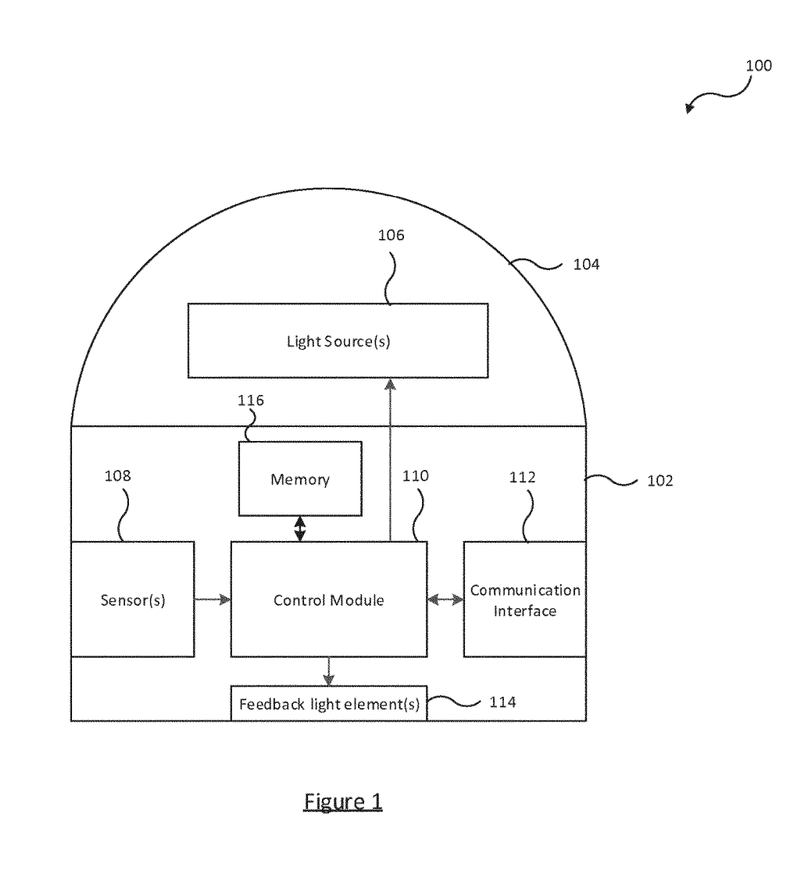
FIG. 1 is a schematic block diagram of a portable lighting device.

Reference is first made to FIG. 1 which illustrates a schematic block diagram of a portable lighting device 100. Note that the form of the portable lighting device 100 shown in FIG. 1 is only illustrative, and the portable lighting device 100 may take various different forms such as a cube (or any other polyhedron), cylinder, sphere, bowl shaped or any other three-dimensional shape.

As shown in FIG. 1 the portable lighting device 100 comprises a housing 102 inside which components of the portable lighting device 100 are housed. Components of the portable lighting device 100 comprise a control module 110 coupled to one or more light sources 106, at least one sensor 108, and a memory 116. The housing 102 may for example comprise a diffuser 104 arranged to diffuse the illumination emitted by the light source(s) 106. It will be appreciated that the portable lighting device 100 may comprise other components and connections not shown in FIG. 1.

The light source(s) 106 are operable to emit light to illuminate an environment of the portable lighting device 100 which comprise an indoor space such as a room or building, and/or an outdoor space such as a garden or park, and/or a partially-covered environment such as a gazebo or stadium, and/or any other type of environment such as the interior of a vehicle.

The light source(s) 106 may comprise any suitable source of light such as e.g. a high/low pressure gas discharge source, a laser diode, an inorganic/organic light emitting diode (LED), an incandescent source, or a halogen source. A light source may be a single light source, or could comprise multiple light sources, e.g. multiple LEDs which may, for example, form an array of light sources collectively operating as a single light source. The light source(s) 106 are controllable in that the light emitted by the light source(s) 106 may be controlled by the control module 110.

In embodiments, the control module 110 is configured to detect user manipulation of the portable lighting device 100 relative to a support surface on which the portable lighting device is supported (e.g. a table, shelf, floor, etc.) based on at least one sensor output signal received from the sensor(s) 108, and control the light emitted from the light source(s) 106 based on the detected user manipulation.

The functionality of the control module 110 referred to herein may be implemented in code (software) stored on a memory (e.g. memory 116) comprising one or more storage media, and arranged for execution on a processor comprising on or more processing units. The code is configured so as when fetched from the memory and executed on the processor to perform operations in line with embodiments discussed below. Alternatively it is not excluded that some or all of the functionality of the control module 110 is implemented in dedicated hardware circuitry, or configurable hardware circuitry like a field-programmable gate array (FPGA).

Figure 2A:
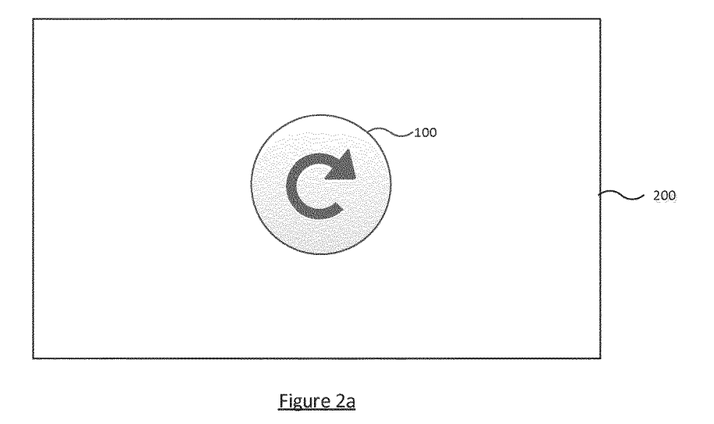
FIGS. 2a and 2b illustrates example user manipulations of the portable lighting device.

One type of user manipulation is rotation of the portable lighting device 100. FIG. 2a illustrates a top view of an example rotation (clockwise) of the portable lighting device 100 relative to a support surface 200. Various sensing means may be used to detect rotation (around its own axis) of the portable lighting device 100.

The at least one sensor 108 may comprise a multiple axis accelerometer (such as a two- or three-axis accelerometer) which is configured to detect movement in various axes and provide a corresponding signal(s) to the control module 110. In this example, the control module 110 is configured to detect rotation of the portable lighting device 100 based on at least the signal(s) received from the multiple axis accelerometer.

Alternatively or additionally, the at least one sensor 108 may comprise a gyroscope which is configured to detect angular motion and provide a corresponding signal(s) to the control module 110. In this example, the control module 110 is configured to detect rotation of the portable lighting device 100 based on at least the signal(s) received from the gyroscope.

Alternatively or additionally, the at least one sensor 108 may comprise a magnetic sensor (such as a compass and/or magnetometer) which is configured to sense the Earth's magnetic field to detect the absolute orientation of the portable lighting device 100 and provide a corresponding signal(s) to the control module 110. In this example, the control module 110 is configured to detect rotation of the portable lighting device 100 based on at least the signal(s) received from the magnetic sensor. In particular, the control module 110 is configured to detect rotation of the portable lighting device 100 based on detecting a change in absolute orientation of the portable lighting device 100.

Alternatively or additionally, the at least one sensor 108 may comprise a rotational mouse. A rotational mouse is a type of computer mouse which expands traditional mouse functionality to facilitate three degrees of freedom by adding a third dimension input, yaw (or Rz), to the existing x (roll) and y (pitch) dimensional inputs. That is, the rotational mouse provides three-dimensional spatial data as an output. In this example, the control module 110 is configured to detect rotation of the portable lighting device 100 based on at least the signal(s) received from the rotational mouse.

Memory 116 stores predefined lighting control commands associated with user manipulations of the portable lighting device 100. For example memory 116 may store predefined lighting control commands associated with rotation of the portable lighting device 100.

In response to detecting rotation of the portable lighting device 100, the control module 110 is configured to query memory 116 to determine a lighting control command to be sent to the light source(s) 106, and send the determined lighting control command to the light source(s) 106.

The lighting command is used to control the light emitted by the light source(s) 106. For example, the lighting command may be used to control one or more lighting parameter (for example the intensity, color, saturation, color temperature, size, shape, pattern, dynamics etc.) of the light emitted by the light source(s) 106. The rotation may provide a gradual, continuous control of a lighting parameter value, or it could provide going through discrete steps of lighting parameter values. For instance, in an embodiment whereby the portable lighting device 100 takes the form of an electronic LED candle, the rotation could control a lighting parameter for the effect currently active on the portable lighting device 100, such as the brightness of the flame effect, the flame size (the number of light source(s) that are emitting light) or the dynamics level of the flame effect (e.g. control the speed at which a predefined light pattern is cycled through).

The control module 110 may select the appropriate lighting control command to be transmitted to the light source(s) 106 in dependence on the detected direction of rotation of the portable lighting device 100. For example, in response to detection of clockwise rotation of the portable lighting device 100, a lighting command to increase a lighting parameter value may be selected by the control module 110, and in response to detection of anti-clockwise rotation of the portable lighting device 100, a lighting command to decrease a lighting parameter value may be selected by the control module 110.

In the scenario whereby rotation controls the intensity of the light emitted by the light source(s) 106, clockwise rotation of the portable lighting device 100 may increase the intensity of the light output by the light source(s) 106 (dim the light up) and anti-clockwise rotation may decrease the intensity of the light output by the light source(s) 106 (dim the light down). It will be appreciated that in this scenario it is possible for a user to turn the portable lighting device on or off by way of rotating the portable lighting device 100. This conceptual operation is known to users from operating a conventional rotary volume knob on a car radio, whereby the rotary knob integrates the on-off switch and the volume control in one single UI element.

Figure 2B:
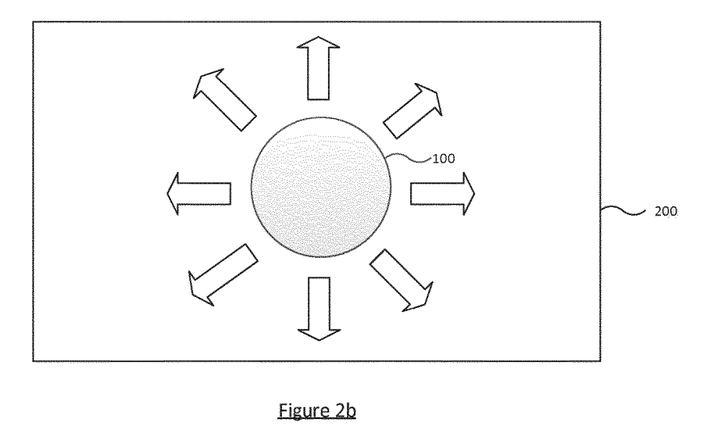

Another type of user manipulation is translational movement of the portable lighting device 100. FIG. 2b illustrates a top view of example translation movement of the portable lighting device 100 in different directions relative to a support surface 200. Various sensing means may be used to detect translational movement of the portable lighting device 100.

The at least one sensor 108 may comprise an accelerometer which is configured to detect translational movement of the portable lighting device 100, which may be linear motion (can be expressed in a single spatial dimension) or non-linear motion (can be expressed in at least two spatial dimensions) and provide corresponding signal(s) to the control module 110. In this example, the control module 110 is configured to detect translational movement of the portable lighting device 100 based on at least the signal(s) received from the accelerometer. This accelerometer may be the same accelerometer described above that is used to detect rotation of the portable lighting device 100 or alternatively may be a dedicated accelerometer for detecting translational movement of the portable lighting device 100.

Alternatively or additionally, the at least one sensor 108 may comprise an optoelectronic sensor which is configured to detect translational movement of the portable lighting device 100 based on sensor technologies widely applied in optical computer mice, and provide corresponding signal(s) to the control module 110. That is, the optoelectronic sensor may comprise a light source (such as a light-emitting diode) and a light detector (such as an array of photodiodes or an image sensor), to detect movement relative to a surface. The optoelectronic sensor (essentially a low resolution video camera) operates by taking successive images of the surface on which the portable lighting device 100 is positioned on and calculates direction and movement based on image analysis. In this example, the control module 110 is configured to detect translational movement of the portable lighting device 100 based on at least the signal(s) received from the optoelectronic sensor.

The memory 116 may store predefined lighting control commands associated with translational movement of the portable lighting device 100.

In response to detecting translational movement of the portable lighting device 100, the control module 110 is configured to query memory 116 to determine a lighting control command to be transmitted to the light source(s) 106, and send the determined lighting control command to the light source(s) 106.

This lighting command is used to control the light emitted by the light source(s) 106. For example, the lighting command may be used to control one or more lighting parameter (for example the intensity, color, saturation, color temperature, size, shape, pattern, dynamics etc.) of the light emitted by the light source(s) 106. The translational movement may provide a gradual, continuous control of a lighting parameter value, or it could provide going through discrete steps of lighting parameter values.

The control module 110 may select the appropriate lighting control command to be transmitted to the light source(s) 106 in dependence on the detected direction of translational movement of the portable lighting device 100.

For example, in response to detection of translational movement in response to a user of the portable lighting device 100 sliding the portable lighting device 100 across a surface in particular direction, a lighting command to increase a lighting parameter value may be selected by the control module 110, and in response to detection of translational movement of the portable lighting device 100 in the opposite direction, a lighting command to decrease a lighting parameter value may be selected by the control module 110.

In this way, for example, users can slide the portable lighting device 100 in a north direction to increase the light intensity the light output by the light source(s) 106 or in a south direction to decrease the intensity of the light output by the light source(s) 106 (dim the light down). Similarly, the sliding directions can be configured to allow users to navigate through a color space. Also other light parameters can be mapped to the sliding actions, e.g. color temperature, speed of dynamic effect, etc.

In the case of the portable lighting device 100 comprising absolute orientation means (magnetometer, compass) lighting commands stored in memory 116 may be associated with translational movement in the four cardinal directions (north, east, south, west) and may further be associated with translational movement in the intercardinal and/or secondary intercardinal directions. This advantageously makes the translational movement control of the light emitted by the light source(s) 106 independent of the exact orientation of the portable lighting device 100, which is advantageous if sliding control is used in combination with rotational control of the lighting device's light effect.

In the above described embodiments, multiple lighting parameters of the light emitted by the light source(s) 106 may be able to be controlled by the user of the portable lighting device 100. The at least one sensor 108 may comprise a mode-switching sensor configured to detect a user input indicative of the user of the portable lighting device 100 wanting to control another lighting parameter and provide a mode-switching output signal to the control module 110. The control module 110 is configured to detect that it is to switch light parameter control mode based on the signal(s) received from the mode-switching sensor. In each light parameter control mode, the control module 110 is configured to control a different lighting parameter of the light emitted by the light source(s) 106 in response to detected user manipulation of the portable lighting device 100 relative to its support surface.

This enables the user of the portable lighting device 100 to control multiple lighting parameters by means of the rotation/translational movement. For instance, the user may first select a color by means of rotation or translational movement of the portable lighting device 100, then provide an input (enabling the mode-switching action to be detected by the mode-switching sensor), and next control the brightness by means of rotation or translational movement of the portable lighting device 100.

The mode-switching sensor may comprise a touch sensitive sensor (e.g. a capacitive touch sensor, strain sensor, force sensor etc.) which is configured to provide a mode-switching output signal to the control module 110 in response to being touched by a user of the portable lighting device 100. Alternatively the mode-switching sensor may comprise a push button switch which is configured to provide a mode-switching output signal to the control module 110 in response to being depressed by a user of the portable lighting device 100. Alternatively, a motion sensor already present on the portable lighting device 100 (e.g. accelerometer) may act as the mode-switching sensor whereby the control module 110 is configured to detect that it is to switch light parameter control mode based on detection of a predetermined motion signal received from the motion sensor.

Alternatively, the controlled lighting parameter may depend on the orientation of the portable lighting device 100. For example, the housing 102 of the portable lighting device 100 may be formed of multiple sides on which the portable lighting device 100 may rest, each of the sides corresponding to a particular light setting or light output adjustment. In these embodiments, the control module 110 is configured to detect the orientation of the portable lighting device 100 (e.g. which side of the portable lighting device 100 is resting on the support surface) and select a light parameter control mode based on the detected orientation. In response to detecting a change in orientation of the portable lighting device 100 (e.g. a change in the surface of the portable lighting device 100 resting on the support surface has changed), the control module 110 is configured to detect that it is to switch light parameter control mode. The detection of the side of the portable lighting device 100 that rests on the supporting surface can be implemented by the control module 110 based on signal(s) received from an accelerometer (of the at least one sensor 108), which measures the Earth gravity force. However, other sensors of the at least one sensor 108 could also be used for this purpose, such as tilt sensor(s), mechanical switch(es), or optical sensor(s) that detect which side the portable lighting device 100 is orientated to the supporting surface.

For instance, in an embodiment whereby the portable lighting device 100 takes the form of a cube shaped electronic LED candle, the control module 110 may control the color of the light emitted by the light source(s) 106 in response to detected rotational/translational manipulation of the portable lighting device 100 when one surface of the portable lighting device 100 is resting on the support surface, and control the intensity of the light emitted by the light source(s) 106 in response to detected rotational/translational manipulation of the portable lighting device 100 when another surface of the portable lighting device 100 is resting on the support surface. It will be appreciated that this is merely an example to illustrate the concept.

Alternatively, the controlled lighting parameter may depend on the type of surface on which the portable lighting device 100 is positioned on. In this embodiment, the at least one sensor 108 comprise a sensor (e.g. an optical sensor) configured to detect a property (e.g. reflectivity, color, surface pattern) of the surface on which the portable lighting device 100 is positioned on and provide corresponding signal(s) indicative of this property to the control module 110.

The memory 116 may store predefined surface type information comprising a plurality of surface types each associated with value ranges of the property detectable by the sensor, and a lighting parameter associated with the surface type. The control module 110 is configured to detect the surface type and thus the lighting parameter to be controlled by querying memory 116 using value(s) of the detected property.

For instance, the control module 110 may control the color of the light emitted by the light source(s) 106 in response to detected rotational/translational manipulation of the portable lighting device 100 when it estimates that the portable lighting device 100 is positioned on a wooden surface and control the intensity of the light emitted by the light source(s) 106 in response to detected rotational/translational manipulation of the portable lighting device 100 when it estimates that the portable lighting device 100 is positioned on a painted surface. It will be appreciated that this is merely an example to illustrate the concept.

The rotation/sliding control of the light output by the portable lighting device 100 enables the technical complexity of the portable lighting device 100 to be reduced as the provision of any further user interaction means, such as buttons and/or touch-sensitive surfaces is not required.

In order to avoid unintentional control of the light emitted by the portable lighting device 100 when the user is manipulating the device for a reasons other than wanting to control the light emitted by the portable lighting device 100, in embodiments the control module 110 is able to selectively operate in an interaction operating mode. Only when the control module 110 is operating in the interaction operating mode does the control module 110 convert sensed motion inputs to lighting commands to control light source(s) 106 of the portable lighting device 100.

Figure 3:
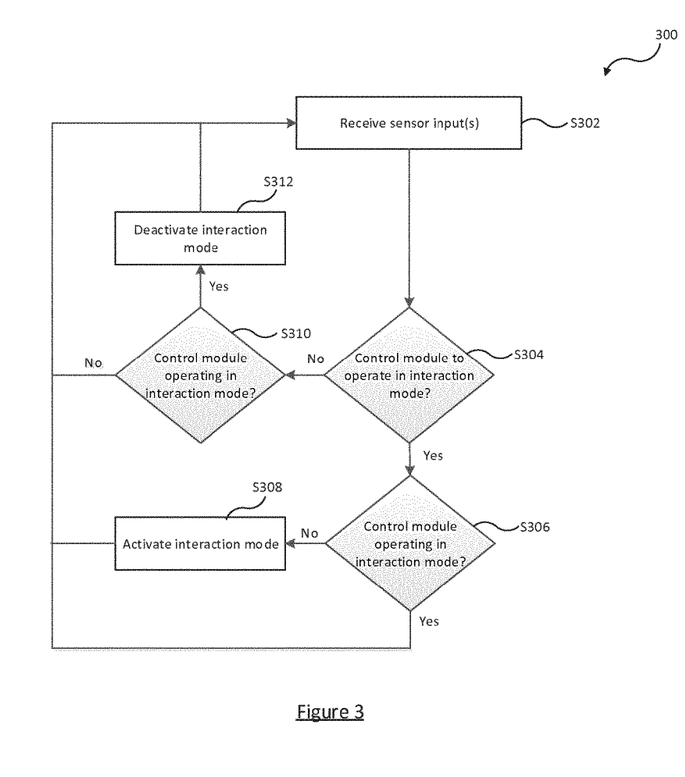
FIG. 3 is a flow chart of a process implemented by a control module of the portable lighting device to control its operating mode.

FIG. 3 is a flow chart of a process 300 implemented by the control module 110 of the portable lighting device 100 to control its operating mode.

At step S302, the control module 110 receives sensor input(s) from one or more of the sensor(s) 108 and determines based on the sensor input(s) whether to operate in the interaction mode at step S304.

If the control module 110 determines that it is to operate in the interaction mode, the process 300 proceeds to step S306. If the control module 110 is already operating in the interaction mode, the process 300 proceeds back to step S302, otherwise the process 300 proceeds to step S308 where the control module 110 activates the interaction mode such that the interaction mode is active and thus the control module 110 is operable control the light source(s) 106 based on detected user manipulation of the portable lighting device 100 relative to a support surface on which the portable lighting device is supported.

Referring back to step S304, if the control module 110 determines that it is not to operate in the interaction mode, the process 300 proceeds to step S310. If the control module 110 is not operating in the interaction mode, the process 300 proceeds back to step S302, otherwise the process 300 proceeds to step S312 where the control module 110 deactivates the interaction mode such that the interaction mode is inactive and thus the control module 110 is not operable control the light source(s) 106 based on detected user manipulation of the portable lighting device 100 relative to a support surface on which the portable lighting device 100 is supported.

The control module 110 may perform the determination at step S304 in various ways described in more detail below.

At step S304, the control module 110 may determine that it is to operate in the interaction mode based on a determination that the portable lighting device 100 is positioned in a substantially horizontal plane. The term "substantially horizontal" is used to refer to the plane having an orientation that is horizontal to less than 45° from the horizontal and this deviation is within the scope of the claims. The control module 110 is able to make this determination based on signal(s) received from the sensor(s) 108. For example, the control module 110 may determine that the portable lighting device 100 is positioned in a substantially horizontal plane based on signal(s) received from an accelerometer, gyroscope, and/or a tilt sensor.

At step S304, the control module 110 may determine that it is to operate in the interaction mode based on a determination that the portable lighting device 100 is positioned on a support surface. The control module 110 is able to make this determination based on signal(s) received from the sensor(s) 108.

For example, the control module 110 may determine that the portable lighting device 100 is positioned on a support surface based on a signal received from a push button switch which is located on a bottom surface of the housing 102 and is configured to provide an output signal to the control module 110 in response to being depressed due to the bottom surface of the housing 102 coming into contact with a support surface.

In another example, the control module 110 may determine that the portable lighting device 100 is positioned on a support surface based on signal(s) received from an optoelectronic sensor which is located on a bottom surface of the housing 102 and is configured to provide an output signal indicative of the amount of sensed light. For example, when the signal received from the optoelectronic sensor is below a predetermined level, the control module 110 may determine that the portable lighting device 100 is positioned on a support surface (due to the support surface covering the optoelectronic sensor reducing the amount of sensed light). The optoelectronic sensor may comprise a sensor which detects the amount of environmental light (such as a photoresistor, phototransistor, photodiode etc.). Alternatively, the optoelectronic sensor may comprise a light source (such as a light-emitting diode or laser) and a light detector (such as an array of photodiodes or an image sensor), to measure the light reflected from the support surface (in a similar manner to an optical computer mouse).

At step S304, the control module 110 may determine that it is to operate in the interaction mode based on a determination that the portable lighting device 100 is being held, touched and/or manipulated in a way that is indicative that a user of the portable lighting device 100 is moving the portable lighting device 100 to control the light emitted by the light source(s) 106 rather than for any other reason. The control module 110 is able to make this determination based on signal(s) received from the sensor(s) 108.

The control module 110 is configured to detect a property of the way a user of the portable lighting device 100 is holding, touching and/or manipulating the portable lighting device 100 by means of a motion sensor (e.g. an accelerometer, gyroscope, and/or tilt sensor), a force sensor and/or a touch sensitive sensor (e.g. a capacitive touch sensor).

The memory 116 may store predetermined force, touch and/or movement information which is indicative that the portable lighting device 100 is being held, touched and/or manipulated in a way such that a user of the portable lighting device 100 is interacting with the portable lighting device 100 to control the light emitted by the light source(s) 106 rather than for any other reason.

The control module 110 is configured to query memory 116 to compare the signal(s) received from the motion sensor, force sensor and/or touch sensitive sensor to the predetermined force, touch and/or movement information to determine whether a user of the portable lighting device 100 is interacting with the portable lighting device 100 to control the light emitted by the light source(s) 106 rather than for any other reason.

For instance, dependent on where the portable lighting device 100 is touched, with how many fingers, with which particular grip, in which direction the portable lighting device 100 is moved and/or the force applied to the portable lighting device 100 may indicate whether the user moved the portable lighting device 100 to control its light effect, or that he wanted to move the device for other reasons.

The memory 116 may store further predetermined force and/or touch information which is indicative that the portable lighting device 100 is being moved towards (i.e. being pulled) the user moving the portable lighting device 100 such that the distance between the user and the portable lighting device 100 is decreasing, or away (i.e. being pushed) from the user moving the portable lighting device 100 such that the distance between the user and the portable lighting device 100 is increasing, based on where the portable lighting device 100 is being touched. The memory 116 may further store predefined lighting control commands associated with translational movement of the portable lighting device 100 towards the user and translational movement of the portable lighting device 100 away from the user.

In one embodiment, the control module 110 is configured to determine a position of a user's fingers touching the portable lighting device 100 during the user manipulation based on the signal(s) received from the force sensor and/or touch sensitive sensor, By querying the memory 116 the control module 110 is configured to detect whether the translational movement of the portable lighting device 100 is towards or away from the user manipulating the portable lighting device 100, and control the light emitted from light source(s) 106 based on this detection. For example, by determining the position of most of the user's fingers on the portable lighting device 100, the control module 110 can determine whether the user is pulling the portable lighting device 100 closer of pushing it away from him.

In one example the control module 110 may control the intensity of the light emitted by the light source(s) 106 in response to the detection by transmission of an appropriate lighting command to the light source(s) 106. For example, the control module 110 may increase the intensity of the light output by the light source(s) 106 (dim the light up) in response to detecting that the user is moving the portable lighting device 100 away from the user, and decrease the intensity of the light output by the light source(s) 106 (dim the light down) in response to detecting that the user is moving the portable lighting device 100 towards the user. It will be appreciated that this is merely an example, and that other lighting parameters may be controlled in a similar manner.

The process 300 performed by the control module 110 avoids unintentional control of the portable lighting device 100. For instance, if the portable lighting device 100 is picked up or moved to another area of a house, the control module 110 determines that the device should not respond to detected motion, so the interaction mode should be de-activated (if active).

Whilst FIG. 3 illustrates the control module 110 making the determination at step S304 based on received sensor input(s), the control module 110 may determine that it is to operate in the interaction mode based on reception of an instruction received from a remote control device (e.g. smartphone).

As shown in FIG. 1, the control module 110 may be coupled to a communication interface 112. The communication interface 112 enables information and/or instructions to be transmitted to and received from remote devices. The communication interface 112 may enable connection to a remote computing device via a wired communication network (e.g. an Ethernet or DMX network) or a wireless communication network (e.g. Wi-Fi, Zigbee, near field communication (NFC), Bluetooth, or other low-rate wireless personal area network).

A user is able to specify the lighting parameter(s) of the light emitted by the light source(s) 106 that are controlled by manipulation of the portable lighting device 100 relative to a support surface on which the portable lighting device 100 is supported, using a remote control device that is able to establish a connection with the portable lighting device 100 via the communication interface 112. That is, the control module 110 may be further configured to detect that it is to control its light parameter control mode based on reception of an instruction received from a remote control device via the communication interface 112.

Figure 4:
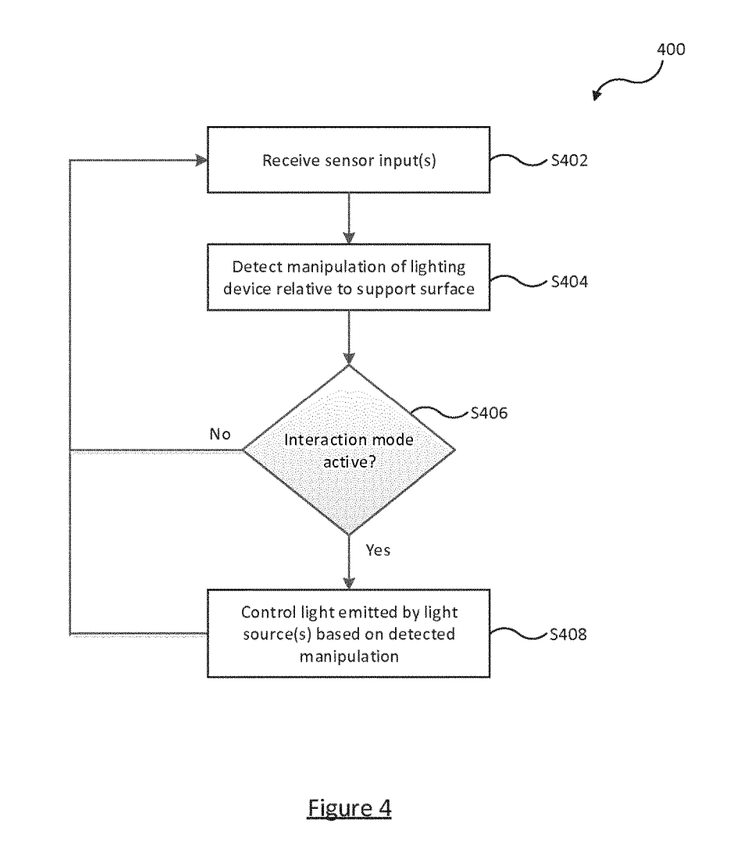
FIG. 4 is a flow chart of a process implemented by the control module to control light emitted from light source(s) of the portable lighting device.

FIG. 4 is a flow chart of a process 400 implemented by the control module 110 to control light emitted from the light source(s) 106 of the portable lighting device 100.

At step S402, the control module 110 receives sensor input(s) from one or more of the sensor(s) 108 and detects, based on the sensor input(s), manipulation of the portable lighting device 100 relative to a support surface on which the portable lighting device 100 is supported at step S404. Example types of user manipulation of the portable lighting device 100 have been described above, these include rotational movement and translational movement of the portable lighting device 100.

At step S406, the control module 110 determines if the detection of the user manipulation occurred whilst the control module 110 was operating in the interaction mode (i.e. the interaction mode was active).

If the control module 110 determines at step S406 that the detection of the user manipulation occurred whilst the control module 110 was operating in the interaction mode, the process 400 proceeds to step S408. At step S408 the control module 110 controls the light output by the light source(s) 106 based on the detected user manipulation of the portable lighting device 100.

If the control module 110 determines at step S406 that the detection of the user manipulation occurred whilst the control module 110 was not operating in the interaction mode (i.e. the interaction mode was inactive), the process 400 proceeds back to step S402, and therefore the control module 110 does not control the light output by the light source(s) 106 based on the detected user manipulation of the portable lighting device 100.

It can be seen from the process 400 that only when the control module 110 is operating in the interaction operating mode does the control module 110 convert sensed motion inputs to lighting commands to control the light source(s) 106 of the portable lighting device 100. This prevents unintended control of the portable lighting device 100 when for example a user moves the portable lighting device 100 when not intending to control the light output of the portable lighting device 100.

When a user controls the portable lighting device 100 through moving it, the user's hand may cover a large section of the device making it difficult to provide feedback to the user on how to control the light emitted by the light source(s) 106. For example a user's hand may obstruct visibility of markings (indicating +/− directions etc.) on the housing 102 of the portable lighting device 100 which provide feedback to the user on how to control the light emitted by the light source(s) 106.

As shown in FIG. 1, the control module 110 may be coupled to at least one light emitting feedback element 114. The at least one light emitting feedback element 114 comprises a plurality of light sources (examples of which have been described above) which are arranged to emit light into the environment of the portable lighting device 100 to provide an indication of the lighting parameter that is varied when a user of the portable lighting device 100 manipulates the device and how manipulation of the portable lighting device 100 varies the lighting parameter.

The control module 110 may control the at least one light emitting feedback element 114 to only give feedback if user actions are being detected, and the control module 110 is operating in the interaction mode.

In embodiments whereby the control module 110 is configured to detect rotation of the portable lighting device 100 and control the light emitted from the light source(s) 106 based on the detected user manipulation, a light emitting feedback element 114 provides an indication on how rotation of the portable lighting device 100 in each direction (clockwise and anti-clockwise) controls the lighting parameter that is controllable in the active light parameter control mode of the control module 110.

In embodiments whereby the control module 110 is configured to detect translational movement of the portable lighting device 100 and control the light emitted from the light source(s) 106 based on the detected user manipulation, a light emitting feedback element 114 provides an indication on how translational movement of the portable lighting device 100 in particular directions controls the lighting parameter that is controllable in the active light parameter control mode of the control module 110.

In embodiments, whereby the control module 110 is configured to detect both rotation and translational movement of the portable lighting device 100 and control the light emitted from the light source(s) 106 based on the detected user manipulation, two light emitting feedback elements may be provided each providing feedback to a user of the portable lighting device 100 on how to control the light emitted from the light source(s) 106.

Figure 5:
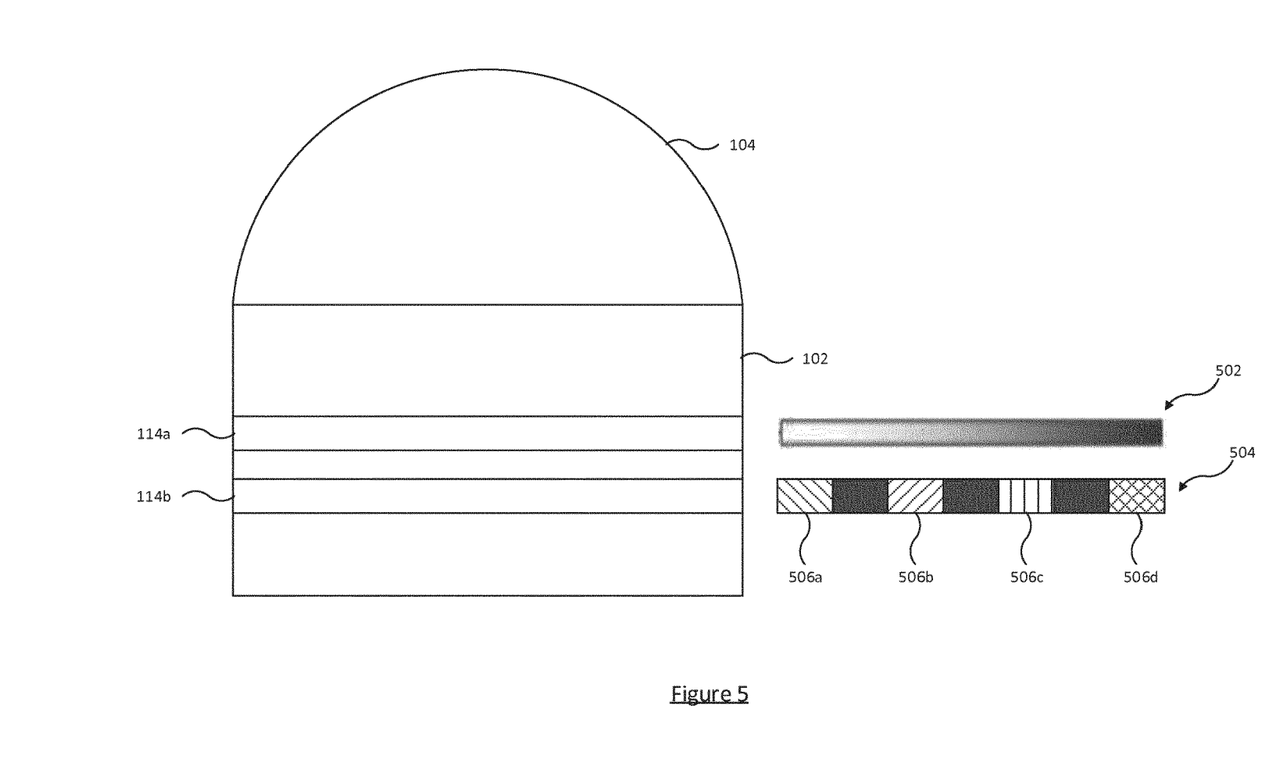
FIG. 5 illustrates feedback lighting elements on an outer surface of the portable lighting device.

FIG. 5 illustrates a side view of an example portable lighting device 100 comprising light emitting feedback elements 114a and 114b on an outer surface of the housing 102 of the portable lighting device 100. In the case where the portable lighting device 100 has a form such that a portion of the portable lighting device 100 has a circular cross-sectional area, the light emitting feedback elements 114a and 114b may take the form of a ring around the circumference of the portable lighting device 100.

As shown in FIG. 5, the light sources of the light emitting feedback element 114a emit light 502 at varying values of a lighting parameter that is controllable in the active light parameter control mode of the control module 110 in response to rotation of the portable lighting device 100. The light sources of the light emitting feedback element 114a may emit light 502 at gradually increasing values of a lighting parameter (shown in FIG. 5) or alternatively may emit light 502 at discrete steps of lighting parameter values.

As shown in FIG. 5, the light sources of the light emitting feedback element 114b emit light 504 at varying values of a lighting parameter that is controllable in the active light parameter control mode of the control module 110 in response to translational movement of the portable lighting device 100. The light sources of the light emitting feedback element 114b may emit light 504 at discrete steps of lighting parameter values (shown in FIG. 5) or alternatively may emit light 504 at gradually increasing values of a lighting parameter.

For example, if the color of the light emitted from the light source(s) 106 is controllable in the active light parameter control mode of the control module 110, the light emitting feedback element 114b may emit light 504 at different colors 506a, 506b, 506c, 506d around the outer surface of the housing 102 of the portable lighting device 100 indicative of how the color of the light emitted from the light source(s) 106 can be controlled when the portable lighting device 100 is moved in different directions. In response to detecting translational movement of the portable lighting device 100 in a direction associated with one of the colors 506, the control module 110 controls the color of the light emitted from the light source(s) 106 by transmission of a lighting command instructing the light source(s) 106 to add color values (e.g. individual numerical values for the red, green and blue (RGB) components) of the color associated with the direction to the color values of the current color of the light emitted from the light source(s) 106. Thus with this slide interaction, the complete color space (at equal intensity) can be reached.

Thus it can be seen that the light emitting feedback element(s) 114 enable feedback to be provided to a user of the portable lighting device 100 on how to control the light emitted by the light source(s) 106, even when the user is holding the portable lighting device 100 to control its light output.

As an addition or as an alternative to the provision of the light emitting feedback element(s) 114, visible markings (indicating +/− directions etc.) on the housing 102 of the portable lighting device 100 may be provided to provide feedback to the user on how to control the lighting parameter that is controllable in the active light parameter control mode of the control module 110.

Whilst embodiments have been described above with reference to the control module 110 controlling the light emitted by the light source(s) 106 based on detection of user rotation and/or translational movement of the portable lighting device 100 relative to a support surface on which the portable lighting device 100 is supported, in other embodiments the control module 110 is configured to additionally control the light emitted by the light source(s) 106 based on detection of other user manipulations of the portable lighting device 100. These other user manipulations of the portable lighting device 100 may include for example, the portable lighting device 100 being picked up, being placed on a surface, being tapped, being shaken, being rolled like dice, and/or one or more three-dimensional gestures.

The memory 116 may store predefined lighting control commands associated with these other manipulations of the portable lighting device 100. The control module 110 is configured to detect one of these other user manipulations based on signal(s) received from the sensor(s) 108 (e.g. a touch sensitive sensor, or motion sensor such as three-axis accelerometer, gyroscope, magnetic sensor etc.)

In response to detecting one of these other user manipulations of the portable lighting device 100, the control module 110 is configured to query memory 116 to determine a lighting control command to be transmitted to the light source(s) 106, and send the determined lighting control command to the light source(s) 106 to control the light emitted by the light source(s) 106.

For instance, the portable lighting device 100 can have a set of stored predefined gesture movements in memory 116 which once recognized by the control module 110 could result in a special light effect being produced by the light source(s) 106. It is also possible that dynamic effects (defined by how light emitted by the light source(s) 106 varies over time) can be composed or adjusted by manipulating the portable lighting device 100. For instance, a user of the portable lighting device 100 could set a color of the light emitted by the light source(s) 106 using rotational control, adjust the brightness of the light using slide control, and then tap a rhythm by tapping on the portable lighting device 100 (or by tapping the lighting device on a table) thereby indicating the desired speed for a dynamic light effect to be generated. For instance, after detection of a predetermined number of taps the portable lighting device 100 starts to create a pulsating light effect by adjusting the brightness of the selected color lighting effect with a speed as indicated by the detected tapping rhythm.

Whilst embodiments have been described above with reference to a single portable lighting device 100, the portable lighting device 100 could be incorporated into a connected lighting system along with one or more other "connected" lighting devices in the lighting system. A "connected" lighting device refers to a lighting device that is connected to one or more other such devices via a wireless or wired connection in order to allow more possibilities for control of the lighting device. For instance, the lighting device in question is often connected to the one or more other devices as part of a wired or wireless network, such as a Wi-Fi, ZigBee or Bluetooth network.

Figure 6:
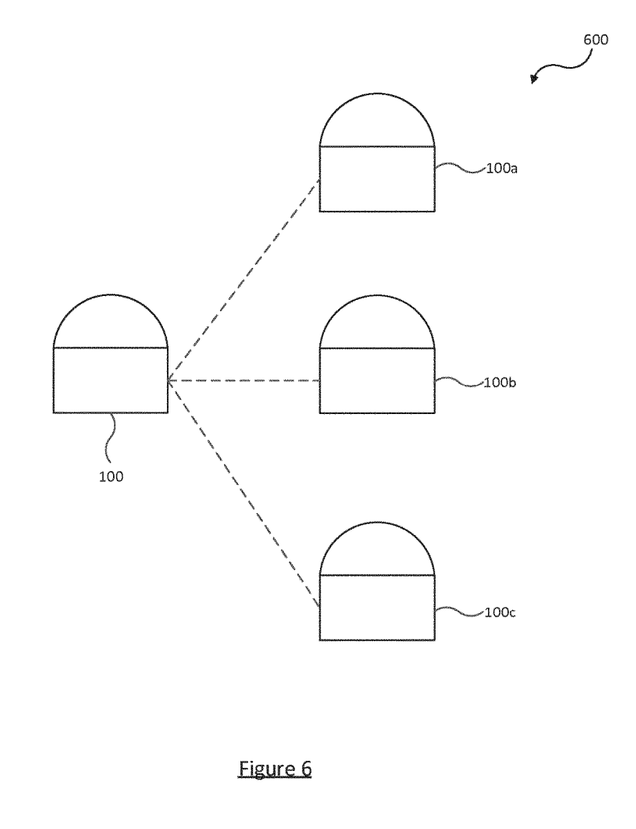
FIG. 6 illustrates a connected lighting system.

FIG. 6 illustrates a connected lighting system 600 comprising the portable lighting device 100 and further connected lighting devices 100a, 100b, and 100c. Whilst three further connected lighting devices are shown in the lighting system 600 it will be appreciated that this number is merely an example. One or more of the further connected lighting devices 100a, 100b, and 100c may also be portable lighting devices (as shown in FIG. 6). Alternatively or additionally, one or more of the further connected lighting devices 100a, 100b, and 100c may be fixed lighting devices (i.e. installed at fixed locations within the environment of the portable lighting device 100, e.g. in the ceiling and/or walls, and/or on light poles fixed to the floor or ground).

In some embodiments, in response to determining a lighting command to control a lighting parameter of the light emitted by the light source(s) 106 based on detection of user manipulation of the portable lighting device 100 relative to a support surface on which the portable lighting device is supported, the control module 110 is configured to transmit the lighting command over a wireless network via the communication interface 112 to one or more of the further connected lighting devices 100a, 100b, 100c to control the light emitted from the further connected lighting devices 100a, 100b, 100c. Thus it can be seen that the portable lighting device 100 can take on the role of "master" to control the light emitted from various "slave" lighting devices. In these embodiments an interaction with the portable lighting device 100 can result in changing the light effects on multiple connected lighting devices (e.g. dimming all lights in a room).

In addition the portable lighting device 100 may be able to control certain connected lighting devices in the connected lighting system 600 based on its location. For example the portable lighting device 100 may control connected lighting devices that are located in a particular area or zone in which the portable lighting device 100 is located. For instance, if the portable lighting device 100 is located in a kitchen it may be configured to control the connected lighting devices located in the kitchen only, whereas when the portable lighting device 100 is located in the living room, the portable lighting device 100 may be configured to only control the connected lighting devices located in the living room.

The control module 110 may utilize geographic location technology for determining the location of the portable lighting device 100, in terms of geographic position relative to the surface of the earth; for example, a satellite based positioning system such as GPS (Global Positioning System, including potential variants such as assisted GPS or differential GPS), GLONASS (Global Navigation Satellite System) or Galileo. Connected lighting devices in the same zone or area as the portable lighting device 100 may be determined by querying pre-stored location information stored in memory 116 or in a remote location database defining locations of fixed lighting devices in the connected lighting system 600.

Alternatively or additionally, the location of the portable lighting device 100 can be determined with respect to a plurality of wireless reference nodes in the connected lighting system 600, in some cases also referred to as anchor nodes. These anchors are wireless nodes whose locations are known a priori, being recorded in memory 116 or in a remote location database which can be queried to look up the location of a node. The anchor nodes thus act as reference nodes for localization. Measurements are taken of the signals transmitted between the portable lighting device 100 and a plurality of anchor nodes, for instance the RSSI (receiver signal strength indicator), ToA (time of arrival) and/or AoA (angle of arrival) of the respective signal. Given such a measurement from three or more nodes, the location of the portable lighting device 100 may then be determined by the control module 110 relative to the anchor nodes using techniques such as trilateration, multilateration or triangulation. Given the relative location of the portable lighting device 100 and the known locations of the anchor nodes, this in turn allows the location of the portable lighting device 100 to be determined in more absolute terms, e.g. relative to the globe or a map or lighting floorplan indicating locations of fixed lighting devices in the connected lighting system 600.

The determination of the portable lighting device's location may be performed according to a "device-centric" approach or a "network-centric" approach. According to a device centric approach, each anchor or reference node emits a respective beacon signal. The portable lighting device 100 takes measurements of beacon signals it receives from the reference nodes, obtains the locations of those nodes from memory 116 or a remote location database, and performs a calculation to determine its own location at the portable lighting device 100 itself. According to a network-centric approach on the other hand, the reference nodes are used to take measurements of beacon signals received from the portable lighting device 100, and an element of the connected lighting system 600 such as a location server performs the calculation to determine the portable lighting device's location. Hybrid approaches are also possible as is known to persons skilled in the art.

Thus access to control of lighting in the connected lighting system 600 may be provided to the portable lighting device 100 on condition that the portable lighting device 100 is found to be located within a certain zone or area (e.g. room of a home).

The beaconing functionality of an anchor node may be integrated into connected lighting devices of the connected lighting system 600 rather than the anchor nodes being separate, dedicated, stand-alone units.

Other localization techniques for position based light control are well known to persons skilled in the art and are therefore not described in further detail herein.

Furthermore, the portable lighting device 100 may be able to control certain connected lighting devices of the connected lighting system 600 that are within a certain proximity to the portable lighting device 100. For example, the portable lighting device 100 may control connected lighting devices that are connected to the same Wi-Fi or Zigbee network or that are within Bluetooth range. Other techniques that may be utilized by the portable lighting device 100 to detect which connected lighting devices are within a certain distance from the portable lighting device 100 are well known to persons skilled in the art and are therefore not described in further detail herein.

It will be appreciated the above embodiments have been described only by way of example.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A portable lighting device comprising:
   at least one light source arranged to emit light to illuminate an environment of the portable lighting device;
   at least one sensor, each of the at least one sensor arranged to provide a sensor output signal; and
   a control module arranged to receive the sensor output signal from each of the at least one sensor, wherein the control module is configured to:
   detect user manipulation of the portable lighting device relative to a support surface on which the portable lighting device is supported based on one or more of the at least one sensor output signal; and
   control the light emitted from the at least one light source based on the detected user manipulation;
   detect translational movement of the portable lighting device relative to said support surface based on one or more of the at least one sensor output signal; and
   control the light emitted from the at least one light source based on the detected translational movement.

2. A portable lighting device according to claim 1, wherein the control module is configured to only perform said control if detection of the user manipulation occurred whilst an operating mode of the control module is active.

3. A portable lighting device according to claim 2, wherein the control module is configured to further determine that the portable lighting device is positioned on said support surface based on one or more of the at least one sensor output signal and activate said operating mode in response to said determination.

4. A portable lighting device according to claim 2, wherein the control module is configured to further determine that the portable lighting device is positioned in a substantially horizontal plane based on one or more of the at least one sensor output signal and activate said operating mode in response to said determination.

5. A portable lighting device according to claim 2, further comprising a communication interface, wherein the control module is configured to further activate said operating mode in response to receiving, via said communication interface, an instruction received from a remote control device.

6. A portable lighting device according to claim 1, wherein the control module is configured to further detect rotation of the portable lighting device relative to said support surface based on one or more of the at least one sensor output signal, and control the light emitted from the at least one light source based on the detected rotation.

7. A portable lighting device according to claim 6, wherein the control module is configured to further control the light emitted from the at least one light source based on a detected direction of rotation.

8. A portable lighting device according to claim 1, wherein the control module is configured to further control the light emitted from the at least one light source based on a detected direction of translational movement.

9. A portable lighting device according to claim 1, further comprising a memory storing a plurality of lighting commands, wherein the control module is configured to further query said memory to determine a lighting command based on the detected user manipulation, and send the lighting command to the at least one light source to control the light emitted from the at least one light source.

10. A portable lighting device according to claim 9, further comprising a communication interface, wherein the control module is configured to further transmit the lighting command, via a network interface, to at least one remote lighting device to control the light emitted by the at least one remote lighting device.

11. A portable lighting device according to claim 1, wherein the control module is configured to further control at least one lighting parameter of the light emitted from the at least one light source based on the detected user manipulation, the at least one lighting parameter being one or any combination of: intensity, color, saturation, color temperature, size, shape, pattern, and dynamics of the light emitted from the at least one light source.

12. A portable lighting device according to claim 11, wherein the control module is configured to further operate in one of a plurality of light parameter control modes, whereby in each light parameter control mode, the control module is configured to control a different lighting parameter of the light emitted from the at least one light source.

13. A portable lighting device according to claim 12, further comprising at least one light emitting feedback element wherein the control module is configured to further control the at least one light emitting feedback to emit light to provide an indication of the at least one lighting parameter that is varied when a user manipulates the portable lighting device and how manipulation of the portable lighting device varies the at least one lighting parameter.

14. A computer program product comprising a non-transitory computer-readable medium having code embodied thereon and being configured so as when executed by a processor of a portable lighting device comprising at least one light source arranged to emit light to illuminate an environment of the portable lighting device, and at least one sensor, each of the at least one sensor arranged to provide a sensor output signal, to:

detect user manipulation of the portable lighting device relative to a support surface on which the portable lighting device is supported based on one or more of the at least one sensor output signal;
control the light emitted from the at least one light source based on the detected user manipulation,
detect translational movement of the portable lighting device relative to said support surface based on one or more of the at least one sensor output signal; and
control the light emitted from the at least one light source based on the detected translational movement.

\* \* \* \* \*